(12) United States Patent
Van Der Heijde

(10) Patent No.: US 9,371,902 B2
(45) Date of Patent: Jun. 21, 2016

(54) BELT-AND-PULLEY-TYPE CONTINUOUSLY VARIABLE TRANSMISSION

(71) Applicant: Ronald Eduard Henri Van Der Heijde, Son (NL)

(72) Inventor: Ronald Eduard Henri Van Der Heijde, Son (NL)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/396,185

(22) PCT Filed: Apr. 23, 2013

(86) PCT No.: PCT/EP2013/001216
§ 371 (c)(1),
(2) Date: Oct. 22, 2014

(87) PCT Pub. No.: WO2013/159910
PCT Pub. Date: Oct. 31, 2013

(65) Prior Publication Data
US 2015/0080158 A1   Mar. 19, 2015

(30) Foreign Application Priority Data
Apr. 23, 2012   (NL) ..................... 1039559

(51) Int. Cl.
*F16H 55/56*   (2006.01)
*F16G 1/21*   (2006.01)
*F16G 1/22*   (2006.01)
(Continued)

(52) U.S. Cl.
CPC .................. *F16H 55/38* (2013.01); *F16H 9/18* (2013.01); *F16H 55/56* (2013.01); *F16H 57/0427* (2013.01); *F16H 57/0489* (2013.01)

(58) Field of Classification Search
CPC ............. F16G 5/16; F16G 5/163; F16G 5/18; F16H 55/56; F16H 55/38
USPC ....................................... 474/8, 242
See application file for complete search history.

(56) References Cited

U.S. PATENT DOCUMENTS 1,028,783 A * 6/1912 Von Rabenau ............ F16G 5/16
                                                      198/851
4,581,000 A * 4/1986 Ferfecki .................... F16G 5/18
                                                      474/201
(Continued)

FOREIGN PATENT DOCUMENTS

DE   10 2004 051360 A1   6/2005
EP       0 994 275 A1   4/2000
(Continued)

OTHER PUBLICATIONS

International Search Report, dated Jul. 11, 2013, from corresponding PCT application.

*Primary Examiner* — Henry Liu
(74) *Attorney, Agent, or Firm* — Young & Thompson

(57) ABSTRACT

Continuously variable transmission with a drive belt (3) and with two pulleys (1, 2) that are each provided with two pulley discs (4, 5) with a running surface (8) for arriving in friction contact with a side face (35) of the drive belt (3), wherein both the running surfaces (8) of the pulleys (1, 2) and the side face (35) of the drive belt (3) are made of steel and wherein during operation of the transmission the friction contact is cooled by lubrication oil. At least one of the running surfaces (8) is provided with a multitude of (micron-scale) dimples (11, 13) and/or of grooves (12, 14, 15) arranged in a specific pattern for taking up lubrication oil.

15 Claims, 3 Drawing Sheets

(51) Int. Cl.
   *F16G 5/16*    (2006.01)
   *F16H 55/38*   (2006.01)
   *F16H 9/18*    (2006.01)
   *F16H 57/04*   (2010.01)

(56) References Cited

U.S. PATENT DOCUMENTS

| | | | | |
|---|---|---|---|---|
| 4,718,881 | A * | 1/1988 | Sugimoto | F16G 5/18 474/201 |
| 4,781,660 | A | 11/1988 | Amataka et al. | |
| 5,011,461 | A * | 4/1991 | Brouwers | F16H 9/24 474/188 |
| 6,045,474 | A * | 4/2000 | Smeets | F16G 5/16 188/201 |
| 6,254,503 | B1 * | 7/2001 | Chiba | F16H 55/56 29/894 |
| 6,440,024 | B1 * | 8/2002 | Kobayashi | F16G 5/163 474/242 |
| 6,537,166 | B1 * | 3/2003 | Adriaenssens | B24B 29/04 451/11 |
| 6,599,212 | B2 * | 7/2003 | Kanokogi | F16G 5/163 474/201 |
| 6,705,963 | B2 * | 3/2004 | Smeets | F16G 5/163 474/201 |
| 6,830,525 | B1 * | 12/2004 | Brandsma | F16G 5/163 474/201 |
| 6,893,370 | B2 * | 5/2005 | Kobayashi | F16G 5/163 474/242 |
| 7,066,858 | B2 * | 6/2006 | Smeets | F16G 5/163 474/201 |
| 7,066,859 | B2 * | 6/2006 | Brandsma | F16G 5/163 474/201 |
| 7,108,624 | B2 * | 9/2006 | Smeets | F16G 5/16 474/201 |
| 7,261,656 | B2 * | 8/2007 | Sakai | F16G 5/163 474/201 |
| 7,806,793 | B2 * | 10/2010 | Yoshida | F16G 5/16 474/188 |
| 7,892,126 | B2 * | 2/2011 | van Lith | F16G 5/16 474/201 |
| 7,958,635 | B2 * | 6/2011 | Yoshida | B24B 39/04 29/892 |
| 8,025,600 | B2 * | 9/2011 | Tani | F16G 5/16 474/249 |
| 8,814,735 | B2 * | 8/2014 | Toyohara | F16G 5/16 474/242 |
| 2002/0052261 | A1 * | 5/2002 | Kanokogi | F16G 5/163 474/242 |
| 2002/0137585 | A1 * | 9/2002 | Smeets | F16G 5/163 474/242 |
| 2002/0183152 | A1 * | 12/2002 | Kobayashi | F16G 5/163 474/242 |
| 2004/0053723 | A1 * | 3/2004 | Smeets | F16G 5/163 474/242 |
| 2004/0072644 | A1 * | 4/2004 | van Lith | F16G 5/163 474/242 |
| 2004/0082417 | A1 * | 4/2004 | Smeets | F16G 5/16 474/242 |
| 2004/0176202 | A1 * | 9/2004 | Sakai | F16G 5/163 474/242 |
| 2005/0059519 | A1 * | 3/2005 | Brandsma | F16G 5/163 474/242 |
| 2005/0090340 | A1 | 4/2005 | Wang et al. | |
| 2005/0217111 | A1 | 10/2005 | Yoshida et al. | |
| 2005/0221938 | A1 * | 10/2005 | Yoshida | F16G 5/16 474/242 |
| 2006/0135306 | A1 * | 6/2006 | Hattori | F16G 5/16 474/242 |

FOREIGN PATENT DOCUMENTS

| | | |
|---|---|---|
| EP | 0 777 069 B1 | 5/2000 |
| EP | 0 997 670 A2 | 5/2000 |
| EP | 1 811 205 A1 | 7/2007 |
| JP | 2005273866 A | 10/2005 |
| WO | 2005/083304 A1 | 9/2005 |
| WO | 2008/116961 A1 | 10/2008 |

* cited by examiner

_US 9,371,902 B2_

BELT-AND-PULLEY-TYPE CONTINUOUSLY VARIABLE TRANSMISSION

BACKGROUND OF THE INVENTION

The present invention relates to the continuously variable transmission that is defined in the preamble of claim 1 hereinafter.

DESCRIPTION OF THE RELATED ART

Such a "belt-and-pulley"-type transmission is generally known in the art, for example from EP 0 777 069 B1, and is a/o used for transmitting mechanical power in a motor vehicle from an engine to a load, i.e. the driven wheels, at a continuously variable speed or torque ratio. In such an automotive application thereof, the drive belt of the transmission includes several transverse segments that are mounted on a ring-shaped carrier. Either lateral side of each segment is provided with a pulley contact surface that arrives in contact with the pulleys of the transmission. Further, each transmission pulley includes two pulley discs that both define a respective conical running surface for the drive belt, which conical running surfaces are mutually facing each other and thus define a predominantly V-shaped circumferential groove wherein the drive belt is accommodated. At least during operation of the transmission, the two pulley discs of both pulleys are urged towards each other by means of activation means, such as a hydraulically operated piston-and-cylinder assembly, to allow torque transmission between the pulleys by means of friction between the drive belt and the pulley discs of each pulley in the circumferential direction.

In order to prevent the friction contact between the pulleys and the drive belt from overheating, a liquid coolant or lubrication oil is circulated in the known transmission. The running surfaces of the pulleys contain pockets for accommodating lubrication oil, in the form of relatively low lying parts thereof, while at the same time the bulk of the surface area of the running surfaces, in the form of higher lying parts thereof, is available for the friction contact, i.e. for bearing the load. Such surface roughness contour thus favourably avoids the build up of lubrication oil between the engaging, i.e. the higher lying parts, of the surfaces involved in the frictional contact and, hence, a loss of traction there between that could otherwise occur.

For an efficient power transfer by the transmission, the coefficient of friction working in the friction contact between the pulleys and the drive belt is preferably chosen as high as possible. Further, for optimum durability of the transmission, the wear of the pulleys and of the drive belt is preferably chosen as low as possible. These preferred conditions of high friction and low wear are, in practice, mutually contradictory. Indeed, without resorting to exotic technical measures, the technologies that are commonly available for increasing friction, typically also increase wear as a side effect. For example, a lubrication oil that is provided with additives that increase friction typically also causes more wear, i.e. increases the rate of wear relative to a similar lubrication oil without such friction-increasing additives. A further example is that it is known in the art that increasing the roughness of a surface involved in a frictional contact, will normally increase not only the (coefficient of) friction in such contact, but also the wear rate.

Over the years, it has been a general desire and a development aim in the art of belt-and-pulley continuously variable transmission design, to increase the friction between the drive belt and the pulleys, without detrimentally increasing the wear rate thereof, i.e. whilst maintaining the customary durability of the transmission. For example, EP 0 997 670 A2 and DE 10 2004 051 360 A1 in this respect teach to apply an irregular surface texture that is characterized by certain values of one or more (standard) surface roughness parameters, such as the well-known arithmetic mean roughness parameter: Ra. Alternatively, JP 2005-273866 A discloses a pulley disc running surface that is provided with at least substantially circular, concentric grooves, while in between such grooves or groove the running surface is flattened. Thus, in a sense, this latter document specifies a self-repeating contour or profile for the running surfaces, rather than defining an irregular or random surface roughness.

It is noted that the known surface specification of JP 2005-273866 A is realized by the manufacturing techniques that are either conventionally applied in relation to the manufacture of transmission pulleys, or that are well-known as such, such as turning, shot-peening, lapping and grinding. Although such approach may minimize the implementation cost of the surface specification JP 2005-273866 A, it is also limited in terms of the results, i.e. the particular surface specifications that can be realized thereby.

SUMMARY OF THE INVENTION

It is an object of the present invention to provide a new surface specification for the pulley disc running surface that combines high friction and low wear in the contact with the drive belt in the belt-and-pulley continuously variable transmission.

It is noted that by providing the pulley disc running surface with dimples, instead of with the known continuous groove(s), more surface area is available for the friction contact with the drive belt, at least in the circumferential direction of the pulley disc. This feature was found to favorably reduce the wear rate of—in particular—the pulley contact surfaces of the drive belt. In accordance with the invention the said dimples are provided to the pulley disc on a micron-scale, preferably occupying a surface area of at least 40 up to about 500 square micron in the conical plane defined by the overall pulley disc.

The 3D shape of a dimple is not critical and may for example be predominantly semi-spherical, (frusto-)conical, cylindrical or even pyramid-like shaped. Still, the dimples are preferably provided with a volume that compares to the volume of the known grooves by providing the dimples in short succession, i.e. at small intervals. Such comparable volume was found to favorably provide the customary lubrication conditions at least in terms of the coefficient of friction between the drive belt and the pulley disc. Preferred values in this respect are a separation of between 20 and 250 micron between two adjacent dimples on pulley disc running surface. Moreover, the dimples are preferably provided with a depth of 3 micron up to 10 micron and preferably around 5 to 8 micron, i.e. somewhat deeper than the known groove depth of 0.5 to 2.5 micron taught by JP 2005-273866 A.

It is noted that by providing the pulley disc running surface with the grooves or the rows of dimples extending, at least in part, in the radial direction, a noticeable improvement of the coefficient of friction was realized relative to the known, substantially concentric arrangement of continuous grooves. It is considered that such improvement is linked to the feature that the pulley contact surfaces of the drive belt transverse segments are provided with grooves extending in the circumferential direction of the belt, such that the grooves or rows of dimples of the running surface are oriented at an angle relative to the grooves of the pulley contact surface of the transverse segment. Perpendicular, i.e. essentially radially oriented grooves and/or rows of dimples of the running surface were found to provide the highest coefficient of friction, however, in some cases the lubrication oil flows away from the friction contact with the drive belt too easily through such radially oriented grooves or rows of dimples of the running surface when the pulley discs rotate during operation. Therefore, it may be preferable that the grooves or rows of dimples of the running surfaces extend at an angle relative to the radial direction. Preferably such angle is 75 degrees or less. Alternatively, the angle at which the grooves or rows of dimples of the running surface extend relative to the radial direction may increase in radially outward direction, such that each such groove or rows of dimples are arc shaped. In this case, the said angle may increase from as little as 0 degrees at the radial inside edge of the running surface to 75 degrees or more at the radial outside edge thereof. Thus shaped grooves or rows of dimples of the running surface are considered favorable in that the coefficient of friction between the pulley disc and the drive belt is thereby made to decrease in relation to an increasing radial position of the friction contact, which can help to improve the efficiency of the transmission as described in WO 2005/083304.

According to the invention the scale or width of the grooves and the diameter of the dimples of the running surface should be substantially smaller than the width of the grooves of the pulley contact surfaces of the drive belt transverse segments. In practice this means that such groove width or dimple diameter should amount to less than 150 micron and, at least in case of the dimple diameter, preferably have value between 10 and 75 micron. A minimal depth of a couple of micron could theoretically suffice for the grooves or rows of dimples of the running surface, especially if a separation between two adjacent such grooves or rows of dimples is small. However, in reality in this respect, a depth of 3 to 10 micron is more reliably attainable in manufacturing. The said separation is preferable in the order of 20 to 250 micron. In case of the rows of dimples a separation between two subsequent dimples in such row is at least a factor of 2 and preferably between 3 to 5 times less than the separation between two adjacent rows of dimples.

It is noted that by providing the pulley disc running surface with the mutually intersecting grooves, i.e. with grooves that are provided on the running surface in a crosshatch pattern such as a checkerboard or a keyboard pattern, a noticeable increase of the coefficient of friction was realized relative to the known, substantially concentric arrangement of continuous grooves. Preferably, a first set of parallel grooves is oriented at least predominantly, but preferably essentially in the radial direction of the respective pulley disc and a second set of parallel grooves is oriented at least predominantly, but preferably essentially in the circumferential direction of the respective pulley disc.

It is considered that the friction increase results from the combination of the operational features provided by the radially oriented grooves of the said first set on the one hand and by the concentric, circumference grooves of the said second set on the other hand.

According to the invention the scale or width of the intersecting grooves of the running surface should be substantially smaller than the width of the grooves of the pulley contact surfaces of the drive belt transverse segments. In practice this means that such intersecting groove width should amount to less than 150 micron and preferably have value between 25 and 100 micron. A minimal depth of a couple of micron could theoretically suffice for the intersecting grooves, especially if a separation between the intersecting grooves of the first set and of the second set is small. However, a depth of 3 to 10 micron is more reliably attainable in manufacturing. The said separation is preferable in the order of 20 to 250 micron.

The invention further relates to a process step in the manufacturing process of the transmission and of the pulley disc in particular, which process step is included for providing the above-defined dimples and/or the grooves in the pulley disc running surface. According to the invention, the said process step entails either the local irradiation of the pulley disc by (focused) microwave or laser beam to evaporate the pulley disc material, or the local chemical treatment of the pulley disc by etching or electrochemical machining to dissolute the pulley disc material. In either case, the grooves and/or dimples can be formed on the micron-scale that is required by the present invention.

According to the invention, the chemical treatments have the advantage relative to the irradiation treatments that the entire running surface of the pulley disc can be processed simultaneously.

In case of the process step of etching, the pulley disc running surface is partly masked by an inert layer, which layer does not cover the surface area parts thereof that will become the grooves and/or dimples. Subsequently, the running surface is immersed in an etching agent for a controlled time period to dissolve a certain quantity of material at the said surface area parts thereof, to form the said grooves and/or dimples. Finally, the running surface is cleaned, for example by rinsing-off the etching agent with a chemically inactive cleaning agent such as soapy water, and the masking layer is normally also removed.

In case of the process step of electrochemical machining, the pulley disc running surface is immersed in an electrolyte and an electrode is positioned such that it faces and is in close proximity with the pulley disc running surface. An electric current is applied between the electrode and the pulley disc for a controlled time period by charging the electrode negatively relative to the pulley disc, to form the said grooves and/or dimples by locally dissolving the material of the pulley disc into the electrolyte. More specifically, either the pulley disc running surface is partly masked by an inert layer, similar to in the process step of etching, or the electrode is provided with ridges and/or peaks that correspond in location and height with the grooves and/or dimples to be formed on the running surface. After such actual electrochemical treatment, the pulley disc is removed from the electrolyte and is cleaned.

According to the invention, this latter process step of electrochemical machining using a "negatively" shaped electrode was surprisingly found to provide superior results in terms of (minimal) drive belt wear in comparison with all of the other process steps mentioned. Although such positive result was unexpected, it could after analysis be attributed to a smoothing of the surface parts of the running surface in-between the grooves and/or dimples that favorably occurs in the above-described process step of electrochemical machining, as a bonus effect. More in particular, by means of shaped electrode electrochemical machining the surface roughness of the running surface excluding the grooves and/or dimples is below 0.1 micron Ra.

BRIEF DESCRIPTION OF THE DRAWING FIGURES

The invention will now further be explained by way of examples given in the accompanying drawing wherein.

DETAILED DESCRIPTION OF THE INVENTION

Figure 1:
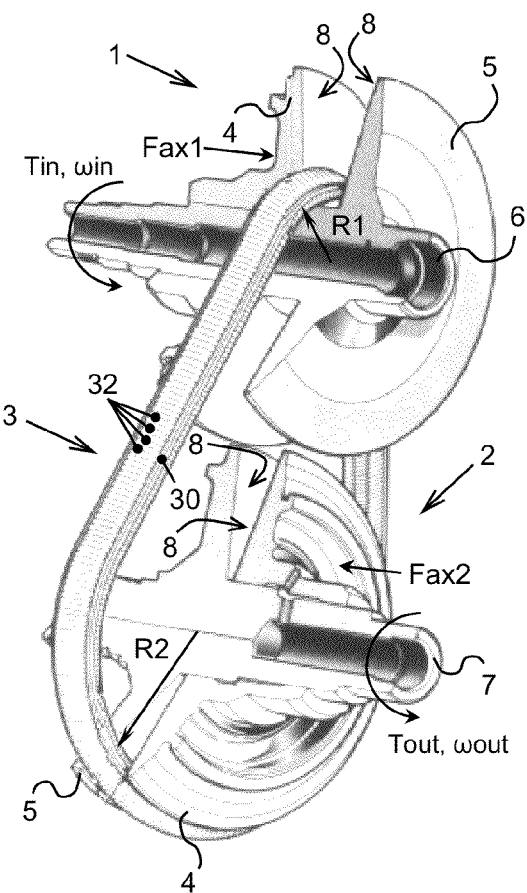
FIG. 1 is a schematic representation of a continuously variable transmission provided with two pulleys and a drive belt, to which transmission the present invention relates.

FIG. 1 schematically shows the central parts of a belt-and-pulley-type continuous variable transmission (CVT). The transmission comprises two pulleys 1, 2 and a drive belt 3 for transmitting a rotational movement ωin, ωout and an accompanying torque Tin, Tout from the one pulley 1, 2 to the other 2, 1 at a variable torque ratio Tout/Tin and speed ratio ωin/ωout. To this end, the pulleys 1, 2 both comprise two pulley discs 4, 5 that each provide a generally conically shaped running surface 8 for supporting a lateral side face 35 of the drive belt 3. One pulley disc 4 of each pulley 1, 2 is incorporated in the transmission axially moveable along a respective pulley shaft 6, 7 over which it is placed.

The transmission also includes an activation system (not depicted) that imposes on the said at least one disc 4 of each pulley 1, 2 an axially oriented clamping force Fax1, Fax2 that is directed towards the other pulley disc 5 of the respective pulley 1, 2, such that the drive belt 3 is clamped between such pairs of pulley discs 4, 5 and a force can be transferred there between by means of friction and in the tangential or circumferential direction relative to the pulley discs 4, 5. Further as a result of such clamping forces Fax 1, Fax 2, the drive belt 3 is tensioned in its circumferential direction and, depending on, a/o, the clamping force ratio Fax1/Fax2, the local radius of curvature, i.e. running radius R1, R2 of the drive belt 3 between the pulley discs 4, 5 of the pulleys 1, 2 is set. Within the context of the present invention, at least the parts of the drive belt 3 and of the pulley discs 4, 5 arriving in physical contact, i.e. the said running surfaces 8 and lateral side faces 35 are made of steel. Typically, at least these latter parts of the drive belt 3 and of the pulley discs 4, 5 are hardened by quench hardening showing a hardness of more than 55 HRC.

Figure 2:
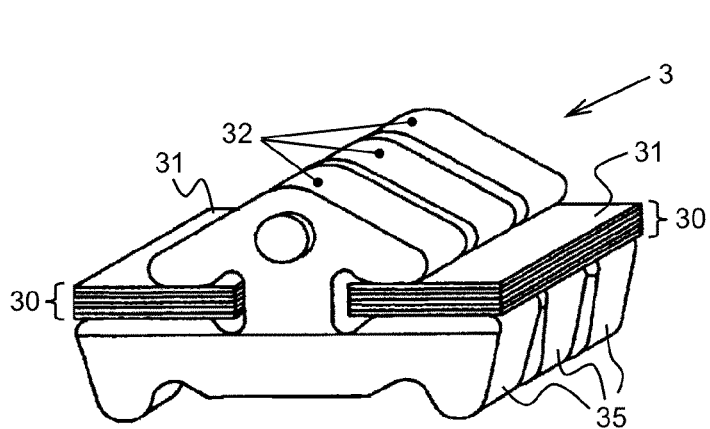
FIG. 2 depicts a section of the drive belt in a perspective view.

FIG. 2 depicts the drive belt 3 in more detail in a perspective view of a small section thereof. In the art several types of drive belt 3 are known, however, in the investigations that have been made in support of the present invention the so-called pushbelt was used, which particular type of drive belt 3 comprises a ring-shaped endless carrier 30 and a row of transverse segments 32 that are individually and slideably mounted on such endless carrier 30 along the circumference thereof. In the shown design example of the drive belt 3, the endless carrier 30 is composed of two sets of radially nested, flat and flexible rings 31. In this known drive belt 3, the said lateral side faces 35 that arrive in contact with the running surfaces 8 of the pulley discs 4, 5 are provided by the axial ends of the individual transverse segments 32. These lateral side faces 35 mutually diverge in (radially) outward direction such that a belt angle of typically 22 degrees is defined there between. This belt angle essentially matches a V-angle that is defined between the conical running surfaces 8 of the pulley discs 4, 5 of the pulleys 1, 2, at least in a cross-section thereof that is oriented in the tangential direction.

In the transmission the transverse segments 32 take-up the forces exerted thereon by the pulleys 1, 2 through the said lateral side faces 35 of the drive belt 3, such that—when a pulley 1, 2 is rotationally driven by, for instance, an internal combustion engine—friction between the running surfaces 8 of the pulley discs 4, 5 and the drive belt 3 causes the transverse segments 32 to be thrust from the rotationally driven pulley 1, 2 to the respective other pulley 2, 1 that, in turn, is rotated by the drive belt 3. This known transmission and in particular the friction contact between the pulleys 1,2 and the drive belt 3 therein, is actively cooled and lubricated by means of a (forced) circulation of lubrication oil.

Figure 3:
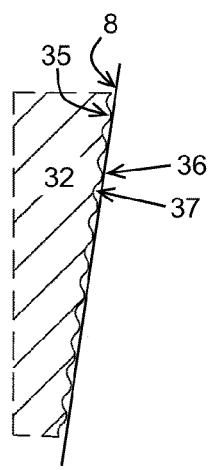
FIG. 3 is a schematic representation of a corrugated lateral side face of the drive belt.

In relation to the lateral side faces 35 of the transverse segments 32 of the drive belt 3 it is known both to apply a flat surface with an irregular surface texture on a microscopic scale and to apply a regularly corrugated surface profile on a macroscopic level (i.e. on a scale visible with the naked eye). In the latter case, the lateral side faces 35 are provided with higher lying ridges 36 and for contacting the pulley discs 4, 5 and with lower lying grooves for accommodating lubrication oil, for example in the manner illustrated in FIG. 3. In the example of FIG. 3 the ridges 36 and grooves 37 are provided with their respective long axis oriented in parallel with the thickness direction of the transverse segment 32, i.e. essentially in parallel with the circumferential or longitudinal direction of the drive belt 3. In the frictional contact with the running surfaces 8 of the pulley discs 4, 5 the normal and the friction force will be essentially carried by the ridges 36, whereas the grooves 37 can accommodate the lubrication oil. In this noted that it is customary in the art that the lateral side face 35, which is typically provided with an overall height dimension of 4 to 8 millimeter, includes more than 20 up to 50 or more separate grooves. During use of the drive belt 3 the tops of the ridges 36 wear-off relatively rapidly, until the ridges 36 take up between 20 and 70% of the (projected) surface area of a side face 35 and such wear becomes minimal. Obviously in this respect, it is also possible to manufacture the transverse segments 32 with ridges 36 with a flat(-tened) top such that the said wear is minimal right from the beginning.

Figure 4:
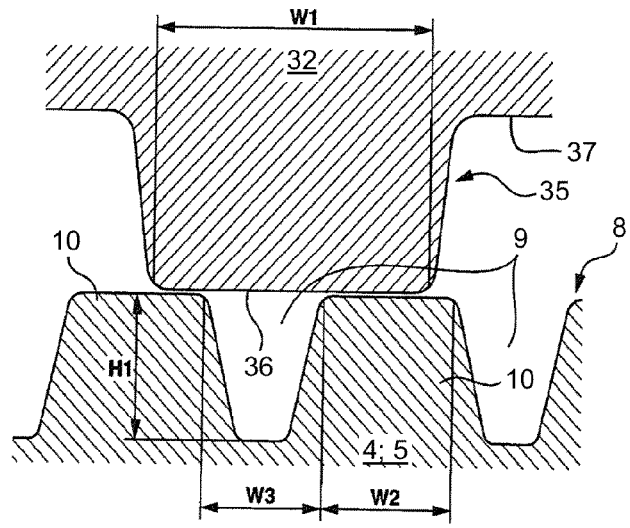
FIG. 4 is an enlarged, schematically drawn cross-section of the contact between the lateral side face of the drive belt and a running surface of a conical disc of the pulley according to the known art.

The above-described, well-known transmission has been successfully applied over many years in passenger vehicles. Because improving the (fuel) efficiency of these vehicles is presently of foremost importance to the industry, also the efficiency of the automatic transmission applied therein, such as the CVT, has become a major R&D topic. In this respect, it is known that the transmission efficiency can be improved by increasing the traction, i.e. the coefficient of friction, between the drive belt and the pulleys. For example JP 2005-273866 A teaches that such traction is increased by providing the running surfaces 8 of the pulley discs 4, 5 with a pattern of circular, i.e. concentric, micron-scale grooves 9 located between likewise concentric ridges 10. This known surface profile of the running surfaces is illustrated in FIG. 4 hereof, which FIG. 4 is reproduced from JP 2005-273866 A and provides an enlarged, schematically drawn cross-section of the contact between the lateral side face 35 of the transverse segment 32 of the drive belt 3 and the running surface 8 of the pulley disc 4, 5. The known running surface 8 is provided with substantially circular, concentric grooves 9 located between likewise circular, concentric ridges 10. The known grooves 9 and ridges 10 of the running surface 8 are shown to be oriented in parallel with the grooves 37 and ridges 36 of the lateral side face 35.

The present invention provides a surface profile for the running surfaces 8 of the pulley discs 4, 5 of the transmission pulleys 1, 2 running surface that represents at least an alternative to the various known surface texture and surface profile specifications. More in particular, the present invention aims to maximise traction in the known CVT without adversely affecting the rate of wear of, in particular, the drive belt and/or the durability of the transmission as a whole.

Figure 5:
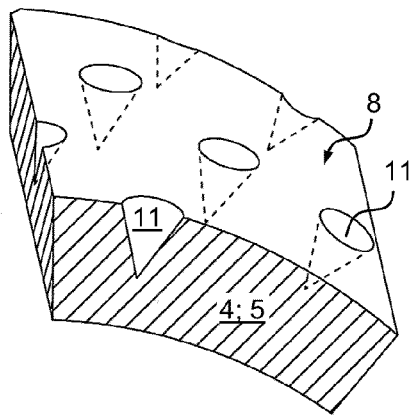
FIG. 5 is an enlarged, schematically drawn cross-section of a part of the pulley disc according to a first embodiment of the invention.

A first embodiment of the invention is schematically illustrated in FIG. 5 in a part of the running surface 8 of a pulley disc 4; 5 in cross-section. As shown in FIG. 5, several cavities or dimples 11 are provided in the running surface 8 in a two dimensional pattern. The dimples 11 are predominantly (inverted) cone-like shaped, however, other shapes such as an (inverted) dome will perform just as well, because the function of the dimples 11 is to form pockets for holding lubrication oil during operation of the CVT. The dimples 11 are preferably sized such that they each occupy a surface area of approximately 75 square micron in the plane of the running surface 8 and have extend for a depth of about 5 micron below such plane.

In FIG. 5 two adjacent dimples 11 are separated in the plane of the running surface 8 over a distance that is only slightly larger than the said depth of a dimple 11, however, in practical embodiments of the invention such separation will typically be larger. In this latter respect, FIG. 6 schematically illustrates a preferred mutual arrangement of the dimples 11 in an enlarged front elevation of (a part of) the running surface 8.

Figure 6:
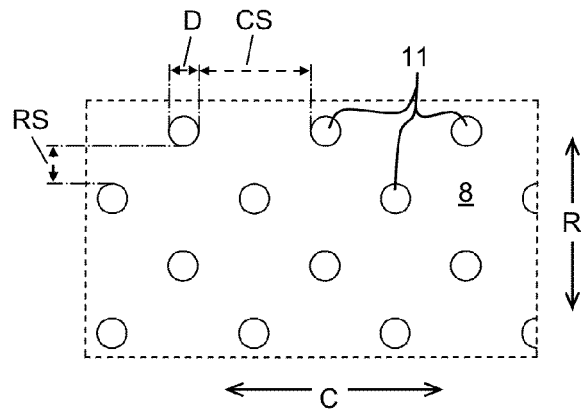
FIG. 6 is an enlarged, schematically drawn front elevation of a part of the running surface of the pulley disc according to the first embodiment of the invention.

In FIG. 6 the dimples 11 are provided in the running surface 8 in a relatively short succession RS in the radial direction R and at a relatively larger separation CS in the circumferential direction C. In particular, in FIG. 6 the dimples 11 are provided with a diameter D of about 20 micron and adjacent dimples 11 are separated in the circumferential direction C over a distance CS of about 75 micron. The separation CR between two such circumferentially arranged rows of dimples 13 amounts to about 25 micron in the radial direction R.

It is noted that, according to the invention, the said separation CR in radial direction R and the said separation CS in circumferential direction C are preferably varied in dependence on the speed ratio ωin/ωout, such that the radial separation increases and the circumferential separation decreases as speed ratio ωin/ωout decreases.

Figure 7:
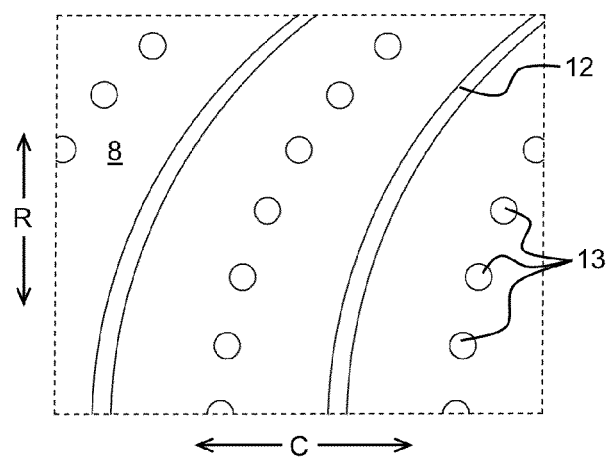
FIG. 7 is an enlarged, schematically drawn front elevation of a part of the running surface of the pulley disc according to a second embodiment of the invention.

A second embodiment of the invention is schematically illustrated in FIG. 7 by way of an enlarged front elevation of (a part of) the running surface 8. According to the invention the cavities in the running surface 8 of the pulley discs 4, 5 for accommodating lubrication oil are in this case provided in the form of mutually alternating rows of dimples 13 and grooves 12, which both predominantly extend in the radial direction R. In the embodiment of FIG. 7, the rows of dimples 13 and the grooves 12 extend at an angle relative to the radial direction, which angle increases in radially outward direction relative to the respective pulley disc 4, 5. It should be noted that in FIG. 7 the curvature of the rows of dimples 13 and the grooves 12 has been extremely exaggerated to be able to illustrate this particular aspect of the invention. Moreover, such curvature is not an essential, but rather an optional feature of the invention. Further, it is not necessary within the scope of the invention to apply the mutually alternating pattern of the rows of dimples 13 and the grooves 12 that is shown in FIG. 7. In stead, it is also possible to apply only rows of dimples 13, only grooves 12, or both rows of dimples 13 and grooves 12 in another pattern.

The rows of dimples 13 of this second embodiment of the invention are sized and spaced similar, if not corresponding, to the dimples 11 of the first embodiment of the invention described hereinabove. The grooves 12 of this second embodiment are also provided on a micron-scale, preferably with a groove depth in the order of 3 to 10 micron and a groove width in the order of 25 to 100 micron. A separation between a groove 12 and an adjacent groove 12 or a row of dimples 13 is preferable in the order of 20 to 250 micron.

Figure 8:
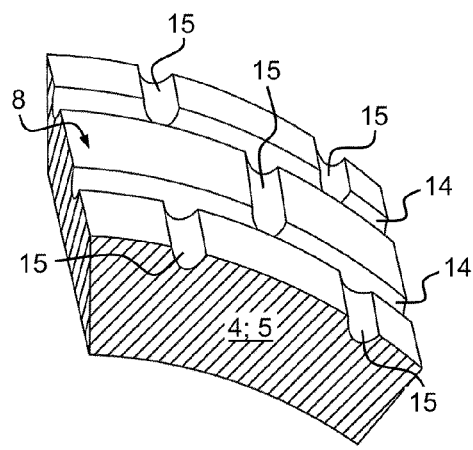
FIG. 8 is an enlarged, schematically drawn cross-section of a part of the pulley disc according to a third embodiment of the invention.
Figure 9:
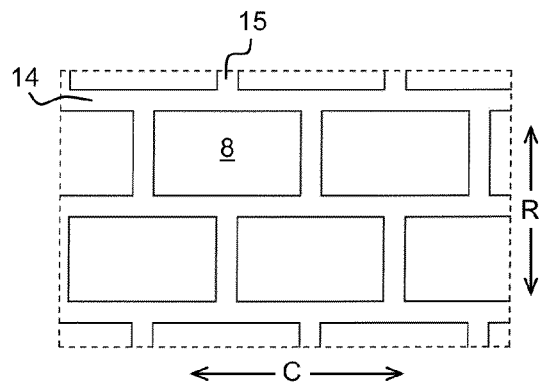
FIG. 9 is an enlarged, schematically drawn front elevation of a part of the running surface of the pulley disc according to the third embodiment of the invention.

A third embodiment of the invention is schematically illustrated in FIG. 8 in a part of the running surface 8 of a pulley disc 4; 5 in cross-section and in FIG. 9 by way of an enlarged front elevation of (a part of) the running surface 8. As shown in FIGS. 8 and 9, the running surface 8 is provided with a surface profile comprising two sets of parallel grooves 14, 15 in a mutually intersecting pattern. The grooves of a first set of parallel grooves 14 are oriented in the circumferential direction C forming a continuous channel along the circumference of the respective pulley disc 4, 5. The grooves of a second set of parallel grooves 15 are oriented in the radial extending only between two adjacent grooves of the first set of parallel grooves 14. In this manner a crosshatch pattern of lubrication oil accommodating channels is provided in the running surface 8 by the two sets of parallel grooves 14, 15.

Figure 10:
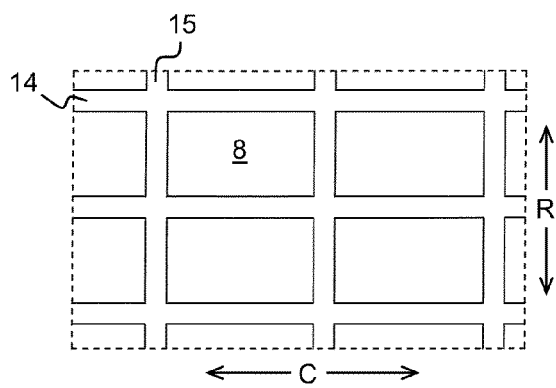
FIG. 10 is an enlarged, schematically drawn front elevation of a part of the running surface of the pulley disc according to a fourth embodiment of the invention.

According to the invention, also the grooves of the second set of parallel grooves can be arranged to form a continuous channel along the radial extend of the respective pulley disc 4, 5. In this latter case, which is schematically illustrated in FIG. 10 in a fourth embodiment of the invention, a checkerboard-like pattern of lubrication oil accommodating channels is provided in the running surface 8, instead of the keyboard-like pattern of FIG. 9.

The two sets of parallel grooves 14, 15 of these third and fourth embodiments of the invention are sized and spaced similar, if not corresponding, to the grooves 12 of the third embodiment of the invention described hereinabove.

The invention not only relates to the entirety of the preceding description and all details of the pertaining figures, but also to all the features of the following claims.

The invention claimed is:

1. A continuously variable transmission comprising:
   a drive belt (3); and
   two pulleys (1, 2),
   each pulley provided with two pulley discs (4, 5) with a running surface (8) that is in friction contact with a lateral side face (35) of the drive belt (3),
   wherein the running surfaces (8) of the pulleys (1, 2) and the lateral side face (35) of the drive belt (3) are made of steel and
   wherein, during operation of the transmission, the said friction contact is cooled by lubrication oil, and
   wherein at least one of the running surfaces (8) is provided with several dimples (11) which dimples are arranged in a regular, non-random, pattern on an otherwise smooth surface of the at least one running surface (8) for accommodating lubrication oil during operation of the transmission and which dimples (11) each cover a surface area in the running surface (8) of at least 40 square micrometer and at most 500 square micrometer.

2. The continuously variable transmission according to claim 1, characterized in that the running surfaces (8) of the pulleys (1, 2) and the lateral side face (35) of the drive belt (3) have a surface hardness between 55 and 65 HRC.

3. The continuously variable transmission according to claim 1, characterized in that the drive belt (3) comprises an endless carrier (30) and a number of transverse segments (32) that are mounted slideably along the circumference of the endless carrier (30) and that are each provided on either side thereof with a lateral side face (35) for the said friction contact with the pulley discs (4, 5).

4. The continuously variable transmission according to claim 3, characterized in that the lateral side faces (35) of the transverse segments (32) are provided with a profiling (36, 37) in the shape of a number of mutually alternating ridges (36) and grooves (37), whereof a lateral dimension of one pair of an adjacently located ridge (36) and groove (37) has a value in the range between 200 and 160 micrometer.

5. The continuously variable transmission according to claim 1, wherein the dimples (11) are arranged on the running surface (8) with a mutual separation of at least 20 micrometer and at most 250 micrometer between each two adjacent dimples.

6. The continuously variable transmission according to claim 5, wherein the dimples (11) have a depth of at least 3 microns and no more than 10 microns when measured relative and perpendicular to the surrounding parts of the running surface (8).

7. The continuously variable transmission according to claim 5, wherein the dimples (11) have a depth of at least 5 microns and no more than 8 microns when measured relative and perpendicular to the surrounding parts of the running surface (8).

8. The continuously variable transmission according to claim 6, wherein a transverse dimension of each of the dimples (11, 13) amounts to 150 micrometer at most.

9. The continuously variable transmission according to claim 6, wherein a transverse dimension of each of the dimples (11, 13) has a value in the range between 10 and 75 micrometer.

10. The continuously variable transmission according to claim 8, the dimples (11) are inverted cone shaped.

11. The continuously variable transmission according to claim 1, wherein at least in-between the dimples (11, 13) said at least one running surface (8) has an (ISO-standard) Ra-surface roughness value of less than 0.1 micrometer.

12. The continuously variable transmission according to claim 10, wherein at least in-between the dimples (11, 13) said at least one running surface (8) has an (ISO-standard) Ra-surface roughness value of less than 0.1 micrometer.

13. The continuously variable transmission according to claim 1, wherein,
 the dimples are arranged in at least four concentric arc-shaped rows, and
 a separation between two adjacent dimples in each row is at least a factor of 2 times less than a separation between two adjacent rows of dimples.

14. The continuously variable transmission according to claim 13, wherein,
 the dimples are arranged in at least four concentric arc-shaped rows, and
 a separation between two adjacent dimples in each row is between 3 to 5 times less than a separation between two adjacent rows of dimples.

15. The continuously variable transmission according to claim 1, wherein the dimples are arranged in at least four concentric arc-shaped rows.

\* \* \* \* \*